J. C. F. Bremser.   Foot Measure.

No. 106314   Patented Aug 16 1870

Witnesses:
J. W. Herthel
Robert Burns

Inventor:
John C. F. Bremser
by his atty
Herthel & G.

United States Patent Office.

JOHN CHARLES F. BREMSER, OF ST. LOUIS, MISSOURI.

Letters Patent No. 106,314, dated August 16, 1870.

IMPROVEMENT IN FOOT-MEASURES.

The Schedule referred to in these Letters Patent and making part of the same

*To all whom it may concern:*

Be it known that I, JOHN CHARLES F. BREMSER, of St. Louis, in the county of St. Louis and State of Missouri, have made a certain new and useful Improved "Foot-Rule;" and I do hereby declare that the following is a full and true description thereof, reference being had to the accompanying drawing and to the letters of reference marked thereon.

The nature of this invention consists in the combination of the usual form of foot-rules for length-measurement with a proper rule for measuring its thickness. Besides the usual scale, the main tablet has also the scale indicating last or boot sizes corresponding to the measurements of the ordinary scale opposite thereto.

To enable those herein skilled to make and use my said invention, I will now more fully describe the same.

Figure 1:
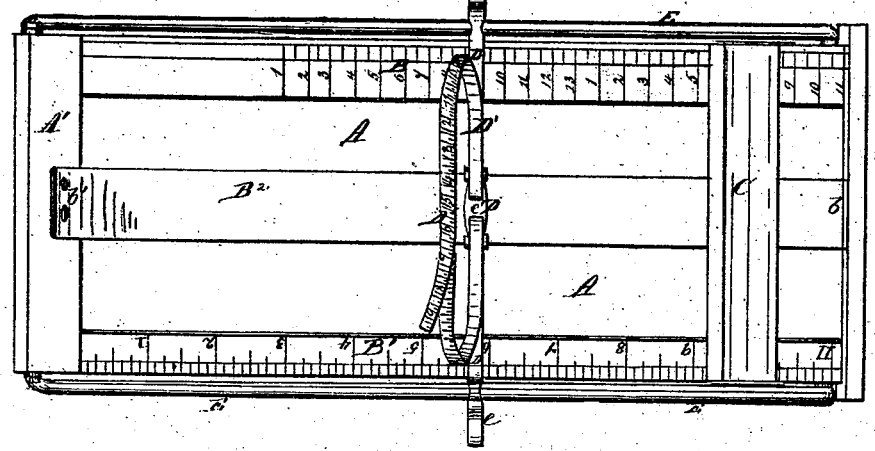
Figure 2:
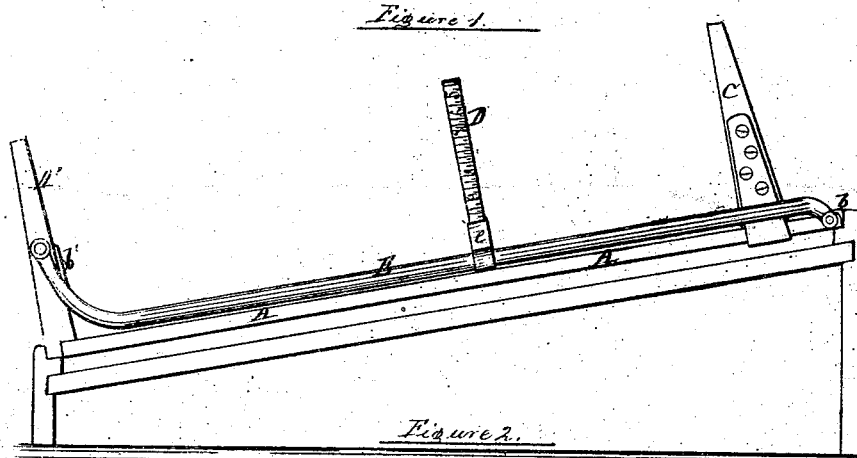
Figure 3:
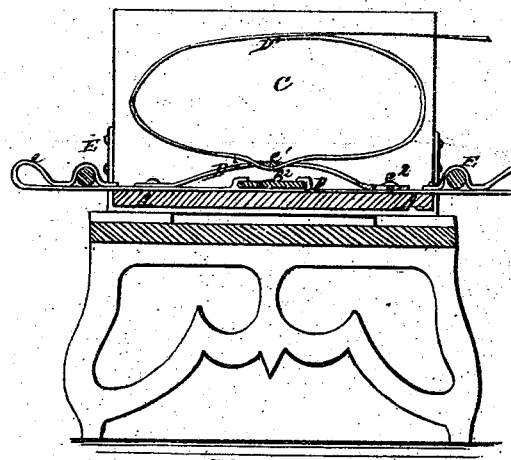

Figure 1 is a top plan.
Figure 2 is a side elevation.
Figure 3 is a section transversely.

A represents a tablet formed of any suitable material, usually wood, having secured thereto, at one end, a heel or upright piece, A'.

Opposite to each other, on the longitudinal face of said tablet A, I arrange respectively the rules or scales B and B', in manner as clearly shown in fig. 1.

The scale B represents the different numbers indicative of the sizes of boots, shoes, &c., known to the trade and custom, and the scale B' is properly the "inch-scale," to indicate at what place from the heel the width of the foot and the width of the last are to be measured, I arrange on the face of said tablet a metal plate or strip, B², having its upper end secured at b, and extending loosely and centrally the full length of said tablet. Its lower end b', however, is inclined to a curve, in accordance with the angle of the heel, and is properly attached to the heel-board A'.

The slide C I connect with the tablet, so as to afford it the proper movement, as shown in fig. 2.

In order to measure the thickness of the foot at the heel, instep, or other parts of the foot, I have arranged a second slide, D, guided in its longitudinal motion over the tablet by the side bars E, while a further guide is taken on the central strip of metal, B².

The slide D projects sufficiently beyond the guides E to form handles e.

In the center said slide forms a raised spring, and there are two mortises cut centrally in said spring at $e^1$, through which one of the usual steel foot-rules D' or other measuring-rule is inserted.

The slide D is properly slotted, as shown at $e^2$, to allow for the vertical motion of the same. This enables the operator to draw the foot-rule D' closely up against the hollow of the foot, as in the instep-measurement.

The use of the instrument is apparent, and its applicability is readily understood by those familiar with the errors so frequently made with the ordinary measuring-instruments.

Having thus fully described my said invention,
What I claim is—

The guides E, combined with the slide D, spring $e^1$, and foot-rule D', substantially as and for the purpose set forth.

In testimony of said invention I have hereunto set my hand in presence of—

JOHN C. F. BREMSER.

Witnesses:
WILLIAM W. HERTKEL,
ROBERT BURNS.